United States Patent Office 3,261,814
Patented July 19, 1966

3,261,814
HYDROXYLATED SUGAR PHOSPHITE
BASED POLYURETHANES
Lester Friedman, Beachwood Village, Ohio, assignor, by
mesne assignments, to Union Carbide Corporation, a
corporation of New York
No Drawing. Original application Sept. 7, 1962, Ser. No.
222,180, now Patent No. 3,219,658, dated Nov. 23,
1965. Divided and this application July 16, 1965, Ser.
No. 484,497
19 Claims. (Cl. 260—77.5)

This invention relates to tertiary phosphite esters of oxyalkylated glycosides and oxyalkylated sugars as well as the corresponding phosphonate esters.

This application is a division of copending application, Serial No. 222,180, filed September 7, 1962, now Patent No. 3,219,658, November 23, 1965. The present application is also a continuation-in-part of application Serial No. 186,662, filed April 11, 1962, now Patent No. 3,092,651, June 4, 1963.

It is an object of the present invention to prepare novel phosphites.

Another object is to prepare novel phosphonates.

A further object is to prepare novel polyurethanes having fire resistant properties.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting oxyalkylated sugars or oxyalkylated glycosides with a triaryl phosphite, trialkyl phosphite or trihaloaryl phosphite. The reaction is usually carried out in the presence of a dialkyl phosphite, diaryl phosphite or dihaloaryl phosphite catalyst although alkaline catalysts can also be employed.

The phosphonates can be formed by rearrangement of the corresponding oxyalkylated sugar phosphite or oxyalkylated glycoside phosphite with a small amount, e.g. 1–10 mole percent, of an alkyl halide.

The polyurethanes are obtained by reacting the phosphite or phosphonate prepared by the manner set forth above with a polyisocyanate.

As the oxyalkylated sugar or glycoside there can be employed octakis(2-hydroxypropyl) sucrose (available commercially as Hyprose SP80 with a molecular weight of 800), octakis(2-hydroxypropoxypropyl) sucrose, octakis(2-hydroxypolypropoxypropyl) sucrose wherein there are 2, 3, 4, or 10 propoxy groups), hexa(2-hydroxypropyl) sucrose, di(2-hydroxypropyl) sucrose, octakis(hydroxyethyl) sucrose, octakis(2-hydroxybutyl) sucrose, octakis(hydroxypolyethoxyethyl) sucrose where there are 2, 3, 4 or 10 ethoxy groups, octakis(hydroxyethoxyethyl) sucrose, octakis(2-hydroxypropyl) lactose, octakis(2-hydroxypropyl) maltose, octakis(2-hydroxypropyl) cellobiose, octakis(hydroxyethyl) lactose, penta(2-hydroxypropyl) dextrose, tetrakis(2-hydroxypropyl) glucose, penta(hydroxyethyl) glucose, tetrakis(hydroxyethyl) glucose, penta(2-hydroxypropoxypropyl) glucose, penta(2-hydroxypolypropoxypropyl) glucose wherein there are 2, 3 or 10 propoxy groups, penta(2-hydroxypropyl) mannose, tetrakis(2-hydroxypropyl) mannose, di(2-hydroxypropyl) glucose, octakis(hydroxyethoxypropyl) sucrose, penta(2 - hydroxypropyl) galactose, tetrakis(2 - hydroxypropyl) galactose, tetrakis(hydroxyethyl) galactose, tetrakis(2 - hydroxypropyl) xylose, tris(2 - hydroxypropyl) xylose, tetrakis(2-hydroxypropyl) arabinose, tetrakis(2-hydroxypropyl) ribose, tris(2-hydroxypropyl) arabinose, tris(hydroxyethyl) xylose, tetrakis(hydroxyethyl) arabinose, tetrakis(2-hydroxypropyl) rhamnose, tris(2-hydroxypropyl) rhamnose, penta(2-hydroxypropyl) fructose, penta(hydroxyethyl) fructose, tetrakis(2-hydroxypropyl) fructose, tetrakis(hydroxyethyl) fructose, penta(2-hydroxypropyl) sorbose, tetra(hydroxyethyl) sorbose, tetrakis(2 - hydroxypropyl) α - methyl glucoside, tetrakis(2-hydroxypropyl) β-methyl glucoside, tetrakis(hydroxyethyl) α-methyl glucoside, tetrakis(2-hydroxypropoxypropyl) α-methyl glucoside, tetrakis(2-hydroxypropoxypropyl) β-methyl glucoside, tris(hydroxyethyl) β-methyl arabinoside, tris(2-hydroxypropyl) α-methyl fructoside, tris(2-hydroxypropyl) α-ethyl glucoside, the reaction product from 3% sucrose, 75% propylene oxide and 22% butylene oxide, tris(2-hydroxypropyl) α-phenyl glucoside, and hydroxyphenethyl sucrose having 9.5 oxyphenethyl groups per sucrose molecule. Preferably all of the available hydroxyls of the sugar or glycoside are oxyalkylated. The preferred sugar is sucrose.

The hydroxyalkyl, hydroxyalkoxyalkyl and hydroxypolyalkoxyalkyl sugars and glycoside employed as starting materials can be prepared in any of the conventional manners for forming oxyalkylated sugars.

Thus the sugar or glycoside can be reacted with an alkylene oxide such as ethylene oxide, propylene oxide, butylene oxide, glycide or methyl glycide, styrene oxide or with a carbonate such as ethylene carbonate, propylene carbonate or butylene carbonate.

Thus, the alkylated sugars or glycosides can be prepared in the manner described in any of the following United States patents:

Schmidt, 1,922,459, August 15, 1933
De Groote, 2,552,528, May 15, 1951
De Groote, 2,626,935, January 27, 1953
De Groote, 2,652,394, September 15, 1953
De Groote et al., 2,819,215, January 7, 1958
Monson et al., 2,819,260, January 7, 1958
Anderson, 2,902,478, September 1, 1959
Griffin, 2,407,001, September 3, 1946
Griffin, 2,407,003, September 3, 1946
Brown, 2,450,079, September 28, 1948
Anderson et al., 2,908,681, October 13, 1959
De Groote et al., 2,945,024, July 12, 1960
De Groote et al., 2,945,025, July 12, 1960

As the oxyalkylated sugar or glycoside for reaction with the tris hydrocarbon phosphite (haloaryl phosphite) there can be used any of the oxyalkylated sugars or glycosides disclosed in any of the aforementioned patents in addition to the oxyalkylated sugars and glycosides specifically set forth above. The presently preferred reactants are octakis(2-hydroxypropyl) sucrose and the related (2-hydroxypropyl) sucrose compounds having more than one oxypropyl group per hydroxyl group in sucrose.

The tertiary alkyl, haloaryl and aryl phosphites which are transesterified with the above sugars or glycosides include triphenyl phosphite, tri-p-cresyl phosphite, tri-o-cresyl phosphite, tri-m-cresyl phosphite, tri-xylenyl phosphite, tris-decyl phosphite, diphenyl decyl phosphite, triethyl phosphite, tri - p - chlorophenyl phosphite, tri-o-chlorophenyl phosphite.

The reaction between the oxyalkylated sugar or glycoside and the tertiary phosphite is preferably catalyzed with 0.1–10% (based on the weight of the tertiary phosphite) of a secondary alkyl, aryl or haloaryl phosphite, e.g. diphenyl phosphite, diethyl phosphite, didecyl phosphite, di-p-chlorophenyl phosphite, di-p-cresyl phosphite, di-o-cresyl phosphite, dimethyl phosphite or di-octadecyl phosphite. Alternatively there can be used 0.1–10% of an alkaline catalyst such as sodium phenolate, sodium cresylate, sodium methylate, sodium decylate, potassium phenolate or the like. The alkaline catalysts preferably have a pH of at least 11 in a 0.1 N solution.

The phosphites of the present invention have numerous uses. Thus they can be employed to react with organic polyisocyanates, e.g. toluene diisocyanate, to form flame resistant polyurethane foams and elastomers which also have outstanding dyeing properties. The phosphites are also useful as lubricants, heat transfer fluids, plasticizers for polyesters, stabilizers for vinyl chloride resins, (e.g. 3 parts of tris(Hyprose SP80) phosphite admixed with 100 parts of polyvinyl chloride) and stabilizers for polyethylene or polypropylene (e.g. 3 parts of tris(Hyprose SP80) phosphite with 100 parts of solid polypropylene or 100 parts of solid polyethylene). The phosphites can also be used to form polyesters, e.g. by reacting with maleic anhydride, phthalic anhydride, dimethyl terephthalate, fumaric acid, adipic acid, itaconic acid or the like. In such ester forming reaction the phosphite and carbon containing reactant are used in proportions such that the hydroxyl groups equal the carboxyl groups. An excess of either reactant can be used if desired.

The phosphites are also useful for conversion to the corresponding phosphonates, e.g. by an Arbuzov rearrangement. The phosphonates of the present invention are useful as anti-static agents for polyethylene and polypropylene and as dye acceptors when incorporated into polyethylene, polypropylene, epoxy resins or polyurethanes. They are also suitable as flame proofing agents for cellulose and cellulose esters. The phosphonates, since they also have free hydroxyl groups, are valuable in the preparation of flame resistant polyurethanes and flame resistant polyesters by reacting with polybasic acids, e.g. terephthalic acid, phthalic acid and adipic acid. The polyesters made from the phosphites and phosphonates of the present invention can be employed as protective coatings for wood, metal or the like.

The foamed polyurethanes prepared from the phosphites and phosphonates of the present invention with or without modifying reactants, e.g. hydroxyl containing polyethers, or hydroxyl containing polyesters can be used as linings for textiles, e.g. coats, suits and dresses, insulation in building construction, carpet underlays, mattresses, pillows, drinking cups, dishes, etc. The unfoamed polyurethanes are useful as threads, e.g. in making girdles and brassieres, as coatings for steel and other metals, wood and glass.

The phosphites of the present invention as previously indicated are made by reacting the oxyalkylated sugar or glycoside with a tris-hydrocarbon or haloaryl phosphite. To form a tris(hydroxyalkyl sugar) phosphite there should be used at least 3 moles of the hydroxyalkyl sugar or glycoside per mole of the triphenyl phosphite or the like. An excess of the oxyalkylated sugar can be used, e.g. 4, 5 or 6 moles per mole of triphenyl phosphite but this usually renders it more difficult to obtain the oxyalkylated sugar phosphite in pure form. If more than 2 but less than 3 moles of polyoxyalkylated sugar or glycoside are employed per mole of triphenyl phosphite (or other trihydrocarbon phosphite) then there are obtained polymeric phosphites having a large number of hydroxyl groups. Thus when 2.5 moles of polyoxyalkylated sugar are employed per mole of phosphite there can be formed a dimer, e.g. 2.5 moles of octakis(2-hydroxypropyl) sucrose reacted with 1 mole of triphenyl phosphite forms a dimer (3 sugar residues and 2 phosphorus atoms) having 34 hydroxyl groups. An analogous dimer having 3 hydroxyl groups is formed from 1 mole of triphenyl phosphite and 2.5 moles of octakis(2-hydroxypropylpolyoxypropyl) sucrose in which the polyoxypropyl has 9 oxypropyl units.

Other polymers can be formed having 3 or more phosphorus atoms in the molecule by utilizing the polymeric phosphite forming procedures set forth in Friedman application Serial No. 129,529, filed August 7, 1961.

Polymeric phosphonates can be formed by rearranging the polymeric oxyalkylated sugar (or glycoside) phosphites in the same manner as the monomeric oxyalkylated sugar phosphites are rearranged. The polymeric oxyalkylated sugar phosphites and phosphonates have the same uses as the monomeric materials.

Mixed phosphites and phosphonates can be prepared if there is employed a mixture of an oxyalkylated sugar and another polyhydric alcohol for reaction with the tris-hydrocarbon phosphite or the like. Thus there can be used dipropylene glycol, tripropylene glycol, polypropylene glycol molecular weight 2025, propylene oxide-1,2,6-hexanetriol adduct molecular weight of 750 (LHT–240) and the corresponding adduct with molecular weight of 2400 (LHT–67), propylene oxide-glycerine adduct molecular weight of 1000 (LG–168) and the corresponding adduct molecular weight of 3000 (LG–56), sorbitol-propylene oxide molecular weight 1000, trimethylolpropane-propylene oxide adduct molecular weight 1000, pentaerythritol-propylene oxide adduct molecular weight 1000 and the corresponding adducts of molecular weights 400, 500, 600 and 750, ethylene oxide-glycerine adduct molecular weight of 1000, ethylene oxide-propylene oxide copolymer molecular weight of 1500. To make the mixed phosphite esters there can be used 1–10 moles of the oxyalkylated sugar or glycoside with 1–10 moles of the other polyhydric alcohol.

It is also possible to make oxyalkylated sugar and glycoside phosphates from the phosphites by careful oxidation with hydrogen peroxide or peracetic acid.

Examples of phosphites and phosphonates of the present invention are tris[octakis(2-hydroxypropyl)sucrose] phosphite and the corresponding phosphonate made by the Arbuzov rearrangement; tris[octakis(2-hydroxypropoxypropyl)sucrose] phosphite and the corresponding phosphonate; tris[octakis(2 - hydroxypolypropoxy)sucrose] phosphite wherein there are 10 propoxy groups and the corresponding phosphonate; tris[hexa(2-hydroxypropyl) sucrose] phosphite and the corresponding phosphonate; tris[octakis(hydroxyethyl)sucrose] phosphite and the corresponding phosphonate; tris[octakis(hydroxypolyethoxyethyl)sucrose] phosphite wherein there are 4 ethoxy groups and the corresponding phosphonates; tris[octakis (2-hydroxypropyl)maltose] phosphite and the corresponding phosphonate; tris[octakis(2-hydroxypropyl)lactose] phosphite and the corresponding phosphonate; tris[penta (2-hydroxypropyl)dextrose] phosphite and the corresponding phosphonate; [tetrakis(2-hydroxypropyl)glucose] phosphite and the corresponding phosphonate; tris [penta(2-hydroxypropoxypropyl)glucose] phosphite and the corresponding phosphonate; tris[penta(hydroxyethyl) glucose] phosphite and the corresponding phosphonate; tris[tetrakis(2-hydroxypropyl)xylose] phosphite and the corresponding phosphonate; tris[penta(2-hydroxypropyl) fructose] phosphite and the corresponding phosphonate; tris[tetrakis(2-hydroxypropyl)-alpha methyl glycoside] phosphite and the corresponding phosphonate; tris[tetrakis (2-hydroxypropoxypropoxypropyl)-alpha methyl glucoside] phosphite and the corresponding phosphonate; tris [octakis(2-hydroxybutyl)sucrose] phosphite and the corresponding phosphonate; the tris(hydroxypolyalkoxyalkyl)sucrose phosphite made by reacting triphenyl phosphite with the reaction product of 3% sucrose, 75% propylene oxide and 22% butylene oxide and the corresponding phosphonate; tris(oxyphenethylsucrose) phosphite wherein there are 9.5 oxyphenethyl groups per sucrose molecule as well as the corresponding phosphonate; octakis(2-hydroxypropyl)sucrose 34-ol diphosphite [made from 2.5 moles of octakis(2-hydroxypropyl) sucrose and 1 mole of triphenyl phosphite] and the corresponding phosphonate; bis[octakis(2-hydroxypropyl) sucrose] dipropylene glycol phosphite and the corespondng phosphonate; octakis(2-hydroxypropyl) sucrose bis (dipropylene glycol) phosphite and the corresponding phosphonate; bis[octakis(2-hydroxypropyl)sucrose] LG–56 phosphite and the corresponding phosphonate; octakis (2-hydroxypropoxypropyl) sucrose bis(LHT–240) phosphite and the corresponding phosphonate.

The oxyalkylated sugar or glycoside phosphites or phosphonates of the present invention can be the sole hydroxyl reactant present or they can be used in admixture with other polyhydroxy compounds (polyols) in forming the polyurethanes. Foamed polyurethanes can be obtained by adding water prior to or simultaneously with the addition of the polyisocyanate.

Alternatively foams can be prepared by uniformly distributing a liquefied halogen substituted alkane containing at least one fluorine atom in its molecule and which vaporizes at or below the temperature of the foaming mass. Such fluorine containing compounds include trichloromonofluoromethane, dichlorodifluoromethane, dichloromonofluoromethane, chlorodifluoromethane, dichlorotetrafluoroethane. The foams can be formed with such fluorine containing compounds in the manner described in General Tire British Patent 821,342 or Barnes United States Patent 3,022,256. If desired, water can be used in conjunction with the liquefied fluorine containing haloalkane.

The foamed polyurethanes, can be made by either the one shot or two step method.

The polyurethanes prepared according to the present invention are solids. In addition to the uses previously set forth they can be employed as shock absorbent filling for packages, upholstery filling material, carpet underlays, hair curlers, cigarette and pipe filters.

The polyurethanes formed can be cured in conventional fashion, e.g. in an oven at 110° C.

As examples of organic polyisocyanates which can be used to make the polyurethanes there can be employed toluene-2,4 - diisocyanate; toluene-2,6-diisocyanate; 4-methoxy-1,3-phenylene diisocyanate; diphenyl methane-4,4'-diisocyanate; 4-chloro-1,3-phenylene diisocyanate; 4-isopropyl-1,3-phenylene diisocyanate; 2,4-diisocyanato-diphenylether; 3,3' - dimethyl - 4,4' - diisocyanatodiphenyl methane; mesitylene diisocyanate; durylene diisocyanate; 4,4'-methylene bis(phenylisocyanate); benzidine diisocyanate; 4,4'-diisocyanatodibenzyl; 3,3'-bitolylene-4,4'-diisocyanate; 1,5-napthylene diisocyanate; tetramethylene diisocyanate; hexamethylene diisocyanate; decamethylene diisocyanate; toluene-2,4,6-triisocyanate; tritolylmethane triisocyanate, 2,4,4'-triisocyanatodiphenyl ether; phenylene diisocyanate; o-, m, and p-xylene diisocyanates. The reaction product of toluene diisocyanate with trimethylolpropane at an NCO/OH ratio of 2:1 (Mondur CB); the reaction product of toluene diisocyanate with 1,2,6-hexanetriol at an NCO/OH ratio of 2:1; the reaction product of toluene diisocyanate with a polyol phosphite at an NCO/OH ratio of 2:1, e.g., when the polyolphosphite is dipropylene glycol tetrol diphosphite or tris(dipropylene glycol phosphite); as well as polyisocyanates listed in Siefken (Annalen, vol. 562, pages 122–135, 1949).

There can also be used polymethylene polyphenylisocyanate molecular weight 380 to 400, having an isocyanate equivalent of 135 (maximum), a viscosity of 400 centipoises (maximum) at 25° C., a NCO content of 31% (minimum), an acid value (p.p.m. of H+) of 200 (maximum). This material is sold commercially under the trademark PAPI. There can also be used bitolylene diisocyanate (TODI) and dianisidine diisocyanate (DADI).

PAPI is particularly useful in forming rigid polyurethane foams.

Alternatively, as the polyisocyanate there can be used prepolymers made by reacting one or more of the above polyisocyanates with a polyhydroxyl compound. The prepolymers should have terminal isocyanate groups. To insure this, it is frequently desirable to employ an excess of 5% or more of the polyisocyanate in forming the prepolymer.

Typical examples of such prepolymers having isocyanate end groups are those formed from toluene diisocyanate and polyhydroxy compounds. Unless otherwise indicated, in the illustrative examples a mixture of 80% 2,4-isomer and 20% 2,6-isomer of toluene diisocyanate was employed in making the prepolymer. Thus, there can be used the prepolymers from toluene diisocyanate and castor oil, toluene diisocyanate and blown linseed oil, toluene diisocyanate and the polyester of ethylene glycol, propylene glycol and adipic acid having a molecular weight of 1900 described in Example I of Kohrn Patent 2,953,839, toluene diisocyanate and polytetramethylene glycol (1000 molecular weight), toluene diisocyanate and polypropylene glycol (molecular weight 2025, toulene diisocyanate and dipropylene glycol, toluene diisocyanate and LG–56 (glycerine-propylene oxide adduct molecular weight of 3000), hexamethylene diisocyanate and pentaerythritol, toluene diisocyanate and sucrose, toluene diisocyanate and polyethylene sebacate, toluene diisocyanate and a mixture of 98% polypropylene glycol molecular weight 1900 with 2% 1,2,6-hexanetriol, toluene diisocyanate and a copolymer of ethylene oxide and propylene oxide having a molecular weight of 2000, toluene diisocyanate and a mixture of polypropylene ether glycol molecular weight 995 and castor oil described in Example 2 of Kane patent 2,955,091, toluene diisocyanate and tris(dipropylene glycol) phosphite, toluene diisocyanate and tris[octakis(2-hydroxypropyl)sucrose] phosphite, toluene diisocyanate and dipropylene glycol hydroxy propoxypropane phosphonate.

As previously stated the polyol phosphites and phosphonates of the present invention, i.e. the oxyalkylated sugar or glycoside phosphites or phosphonates, can be the sole hydroxyl reactant present or they can be used in admixture with other polyhydroxy compounds in forming the polyurethanes. Examples of such compounds are polyethylene glycols having molecular weights of 400 to 3000; polypropylene glycols having molecular weights of 400 to 3000; ethylene glycol; diethylene glycol; triethylene glycol; propylene glycol; dipropylene glycol; tripropylene glycol; thiodiglycol; glycerol; trimethylolethane; trimethylolpropane; ether triols from glycerine and propylene oxide having molecular weights of 1000 and 3000, ether containing triols from 1,2,6-hexane triol and propylene oxide having molecular weights of 750, 1500, 2400 and 4000; sorbitol-propylene oxide adduct molecular weight 1000; pentaerythritol-propylene oxide adduct molecular weight 1000; trimethylolphenol; octakis(2-hydroxypropyl) sucrose, pentaerythritol; castor oil; blown linseed oil; blown soya oil; N,N,N',N'-tetrakis(2-hydroxypropylene) ethylene diamine; mixed ethylene glycol-propylene glycol adipate resin molecular weight 1900; polyneopentylene sebacate; reaction product of 1 mole of trimethylolpropane with 3000 to 12,000 molecular weight units of 1,4-butanedioladipic acid polyester; oxypropylated p-tert. butylphenolformaldehyde resin of Example 2b of De Groote United States Patent 2,499,365; tris(dipropylene glycol)phosphite; tris(polypropylene glycol 2025) phosphite; dipropylene glycol tetrol diphosphite; dipropylene glycol hydroxypropoxypropane phosphonate; penta hydroxyethyl dextrose; bis-polypropylene glycol 2025 ester of hydroxypolypropoxypropane phosphonic acid (wherein the hydroxy polypropoxypropane group has a molecular weight of about 2025); bis-diethylene glycol ester of hydroxyethoxyethane phosphonic acid, bis-tripropylene glycol ester of butanephosphonic acid.

From 5 to 100% by weight of the hydroxyl component can be the oxyalkylated sugar or glycoside phosphite or phosphonate of the present invention.

In preparing the cured and/or foamed polyurethanes any of the conventional catalysts can be employed, e.g. sodium hydroxide, sodium methylate, sodium phenolate, tertiary amines, e.g. N-methyl morpholine, N-ethyl morpholine, 1,2,4-trimethylpiperazine) trimethyl amine, triethyl amine, tributyl amine and other trialkyl amines. The esterification product of 1 mole of adipic acid and 2 moles of diethyl ethanolamine, triethyl amine citrate, 3-morpholino-propionamide 2-diethylaminoacetamide, triethylene diamine, N,N,N',N'-tetrakis(2-hydroxypropyl) ethylene diamine, tribenzyl amine, N,N'-dimethyl-piperazine, N,N-dimethyl hexahydroaniline, 2,2,1-diazabicyclooctane, 1,2-dimethylimidazole, arsenic trichloride, antimony pentachloride, titanium tetrachloride, dioctyl lead diacetate, octylene glycol titanate. There can also be used tin compounds having at least one direct carbon to tin valence bond, e.g. hydrocarbon tin acylates such as dibutyltin dilaurate, dibutyltin dioctoate, tributyltin monolaurate, dimethyltin diacetate, dibutyltin maleate, hydrocarbon tin alkoxides, e.g. dibutyltin diethoxide and dibutyltin dimethoxide, octyl stannoic acid, trimethyltin hydroxide, trimethyltin chloride, triphenyltin hydride, triallytin chloride, tributyltin fluoride, dibutyltin dibromide, bis(carboethoxymethyl) tin diiodide, tributyltin chloride, trioctyltin acetate, butyltin trichloride, octyltin tris(thiobutoxide), dimethyltin oxide, stannous octanoate, dioctyltin oxide, diphenyltin oxide, stannous oleate as well as the other tin compounds set forth in Hostettler French Patent 1,212,252 and Barnes United States Patent 3,022,256.

There can also be used a small amount, e.g. 0.001 to 10% by weight of the total ingredients of a stabilizing or thickening agent, e.g. methoxylated cellulose, ethyl cellulose, hydroxyethyl cellulose, benzyl cellulose, cellulose acetate, cellulose acetate-butyrate, hydroxyethyl polyvinyl alcohol, polyvinyl chloride, polymerized methyl methacrylate.

Fillers can be added in amounts up to 20% by weight, e.g. clay, diatomaceous earth, powdered aluminum and beryllium, vermiculite, cork, bark, foamed polystyrene, foamed polyethylene and foamed polypropylene can be used.

Conventional surfactants can be added in an amount of 0.1–5% by weight of the composition. Preferably less than 1%, e.g. 0.2% of surfactant is employed. The preferred surfactants are silicones, e.g. polydimethyl siloxane having a viscosity of 3 to 100 centistokes, trimethoxydimethyl polysiloxane molecular weight 850 copolymerized with a dimethoxypolyethylene glycol of molecular weight 750 as well as any of the other siloxanes disclosed in Hostettler French Patent 1,212,252 and the siloxane-oxyalkylene copolymers having from about 10 to 80% by weight of siloxane polymer and from 90 to 20% weight of alkylene oxide polymer such as the copolymers described in United States Patent 2,834,748.

Unless otherwise indicated, all parts and percentages are by weight.

In the following examples, unless otherwise indicated, when toluene diisocyanate was employed it was a mixture of 80% of the 2,4-isomer and 20% of the 2,6-isomer.

In preparing one shot foams in the examples there was utilized the following standard formulation:

Water _____ 0.37 gram.
Dibutyltin dilaurate _____ 0.07 gram.
Polydimethyl siloxane (50 centistokes grade) _____ 0.12 gram.
N-ethyl morpholine _____ 0.1 gram.
Polyol _____ As indicated.

This mixture is designated in the examples as Formulation A.

Foams were made by adding Formulation A to 5.2 grams of the toluene diisocyanate. The foams were then cured in a 110° C. oven for about 20 minutes.

This application is a continuation-in-part of my application Serial No. 186,662, filed April 11, 1962, entitled "Interesting Phosphonates."

Unless otherwise indicated, all parts and percentages are by weight.

*Example 1*

Hyprose SP80 [octakis(2-hydroxypropyl) sucrose with an average molecular weight of 800] in an amount of 3 moles (2400 grams) was reacted with one mole (310 grams) of triphenyl phosphite in the presence of 5 grams of diphenyl phosphite at 135° C. under reduced pressure. The phenol formed was distilled off in vacuo. The liquid residue was tris (Hyprose SP80) phosphite which contained 21 free hydroxyl groups.

This compound was rearranged to the corresponding phosphonate by heating at 135° C. for 8 hours in the presence of 5 mole percent of butyl bromide.

The phosphite and phosphonate prepared in Example 1 are both useful for reaction with isocyanates, e.g., with a slight excess (on an equivalence basis) of toluene diisocyanate, to give flame-resistant polyurethane foams, e.g., by adding water or by foaming with a fluorinated hydrocarbon. The Hyprose SP80 phosphites and phosphonates can be used alone to give rigid polyurethane foams or in admixture with other polyols to give rigid or flexible foams.

Condensed phosphites and phosphonates can be prepared by varying the mole ratio of Hyprose SP80 to triphenyl phosphite.

The Voranols utilized in the following examples are all oxypropylated sucroses and differ only in the amount of oxypropylation. These Voranols have the following properties:

| Voranol | Mol. Wt. | Percent OH | OH Equiv. | OH Number | Mols of propylene oxide/mol of sucrose |
|---------|----------|------------|-----------|-----------|----------------------------------------|
| RS350   | 1,356    | 10.78      | 157       | 350       | 17.4                                   |
| RS375   | 1,304    | 11.3       | 150.5     | 375       | 16.6                                   |
| RS410   | 1,138    | 11.95      | 142.3     | 410       | 13.8                                   |
| RS450   | 1,000    | 13.62      | 124.8     | 443       | 11.4                                   |
| RS530   | 856      | 15.8       | 108       | 528       | 9                                      |

*Example 2*

856 grams (1 mole) of Voranol RS530 [octakis(2-hydroxypropyl) sucrose with an average molecular weight of 856], 104 grams of triphenyl phosphite (0.33 mole) and 4 grams of a 66% solution of diphenyl phosphite in phenol were mixed together and heated for 2 hours at 105–110° C. and then distilled at 10 mm. and the following cuts were obtained.

(1) Up to 160° C.: 36 grams, softening point 39.2° C.,
(2) 160–190° C.: 36 grams, softening point 38.4° C. (pure phenol is 40.8° C.),
(3) 190–200° C.: with nitrogen sparging for 2.5 hours, 25 gms. $N_D^{25}$ 1.5240 (phenol would have an $N_D$ of about 1.5440 under these conditions).

The residue in the pot was tris[octakis(2-hydroxypropyl)sucrose] phosphite, a dark amber, clear, very viscous liquid having an $N_D^{48}$ 1.4805. The yield was 857 grams (theory 866 grams).

*Example 3*

628 grams (0.5 mole) of Voranol RS350, 52 grams (0.167 mole) of thiphenyl phosphite and 1 gram diphenyl phosphite (catalyst) were heated at 110–115° C. for 1 hour and then the mixture was distilled at 10 mm. After removal of most of the phenol (40 grams) the balance was removed by nitrogen entrainment and raising the pot temperature to 160° C. The residue in the pot was tris(Voranol RS350) phosphite, a dark, amber, clear viscous liquid.

A sample of the product of Example 3 was rearranged to the corresponding phosphonate which also was a liquid by heating at 140° C. for 6 hours with 0.5% of propylene bromohydrin.

Example 4

In a similar manner to Example 3, Voranol RS375 in an amount of 0.5 mole was transesterified with 0.167 mole of triphenyl phosphite in the presence of 1 gram of diphenyl phosphite to give tris(Voranol RS375) phosphite as a viscous liquid.

The product of Example 4 was rearranged with 0.6% of propylene bromohydrin by heating at 140° C. for 6 hours.

Example 5

The procedure of Example 3 was repeated replacing the Voranol RS350 by Voranol RS410 to produce tris (Voranol RS410) phosphite, a viscous liquid.

Tris(Voranol RS410) phosphite was rearranged by heating at 140° C. for 6 hours with 0.5% of propylene bromohydrin to form the corresponding tris(Voranol RS-410) phosphonate.

Example 6

In a manner similar to that in Example 3 Voranol RS450 in an amount of 0.5 mole was transesterified with 0.167 mole of triphenyl phosphite in the presence of 1 gram of diphenyl phosphite to give tris(Voranol RS375) phosphite as a viscous liquid.

The above-described polyol phosphites and phosphonates are compatible with other polyols and isocyanates in forming urethane foams. They also can be used as the sole polyol in making polyurethane foams.

Example 7

Formulation A was used employing 4.7 grams of tris[octakis(2-hydroxypropyl)sucrose]phosphite as the polyol. Upon addition of 5.2 grams of toluene diisocyanate a solid foam was obtained which was cured in an oven at 110° C. in conventional fashion for 20 minutes.

Example 8

Formulation A was used employing a mixture of 2.35 grams of tris[octakis(2-hydroxypropyl)sucrose] phosphite and 7.2 grams of glycerine-propylene oxide adduct molecular weight 3000 (LG–56) as the polyol. Upon addition of 5.2 grams of toluene diisocyanate, a solid foam was obtained which was cured at 110° C. in conventional fashion.

Example 9

142 grams of tris(Voranol RS410) phosphite, 35 grams of trichlorofluoromethane, 0.70 gram Dabco (catalyst) were cooled and thoroughly mixed together. Then a mixture of 92 grams of toluene diisocyanate and 1.14 grams of DC silicone oil 199 (a polydimethylsiloxane) was added and the mixture vigorously stirred and then poured into a large cup. The mixture foamed to give after curing at 110° C., a rigid, orange-yellow colored foam.

Example 10

The procedure of Example 9 was repeated replacing the toluene diisocyanate by 46 grams of PAPI (polymethylene polyphenylisocyanate) to form a rigid foam.

Example 11

Formulation A was used employing 2.06 grams of bis(hydroxypropoxypropyl) hydroxypropoxypropane phosphate as the polyol. Upon the addition of 2.6 grams of PAPI a foam was produced which cured at 110° C. to a good rigid foam.

I claim:

1. A polyurethane comprising the reaction product of a phosphorus compound selected from the group consisting of phosphites and phosphonates of hydroxyalkyl sugars, hydroxyalkoxyalkyl sugars, hydroxypolyalkoxyalkyl sugars, hydroxyalkyl glycosides, hydroxyalkoxyalkyl glycosides and hydroxypolyalkoxyalkyl glycosides, said phosphorus compound having a plurality of hydroxy groups and an organic polyisocyanate.

2. A polyurethane according to claim 1 wherein the phosphorus compound is a tris(hydroxyalkyl sugar)phosphite wherein there are 2 to 4 carbon atoms in the alkyl group.

3. A polyurethane according to claim 1 wherein the phosphorus compound is a tris(hydroxyalkoxyalkyl sugar) phosphite wherein there are 2 to 4 carbon atoms in each of the alkoxy groups and in the alkyl group.

4. A polyurethane according to claim 1 wherein the phosphorus compound is a tris(hydroxypolyalkoxyalkyl) sugar phosphite wherein there are 2 to 4 carbon atoms in each alkoxy group and in the alkyl group.

5. A polyurethane according to claim 1 wherein the phosphorus compound is a (polyhydroxyalkyl sucrose) phosphite wherein there are 2 to 4 carbon atoms in the alkyl groups present.

6. A polyurethane according to claim 1 wherein the phosphorus compound is a tris[octakis(hydroxyalkyl)sucrose] phosphite wherein there are 2 to 4 carbon atoms in the alkyl group.

7. A polyurethane according to claim 1 wherein the phosphorus compound is tris[octakis(2-hydroxypropyl) sucrose] phosphite.

8. A polyurethane according to claim 1 wherein the phosphorus compound is a tris[octakis(hydroxyalkoxyphosphorus compound is a tris[octakis(2-hydroxypropyl) alkyl)sucrose] phosphite wherein there are 2 to 4 carbon atoms in each of the alkoxy groups and in the alkyl group.

9. A polyurethane according to claim 1 wherein the phosphorus compound is a tris[octakis(hydroxypolyalkoxyalkyl)sucrose] phosphite wherein there are 2 to 4 carbon atoms in each alkoxy group and in the alkyl group.

10. A polyurethane according to claim 1 wherein the phosphorus compound is a tris(mixed hydroxyalkyl and hydroxyalkoxyalkyl sucrose) phosphite wherein there are 2 to 4 carbon atoms in each alkyl group and in each alkoxy group present and the total of the hydroxy alkyl and hydroxyalkoxyalkyl groups prior to formation of the phosphite totals eight.

11. A polyurethane according to claim 1 wherein the phosphorus compound is a (hydroxyalkyl sugar) phosphite wherein there are 2 to 4 carbon atoms in the alkyl group.

12. A polyurethane according to claim 1 wherein the phosphorus compound is a phosphonate of a poly(hydroxyalkyl) sugar wherein each of the alkyl groups has 2 to 4 carbon atoms.

13. A polyurethane according to claim 1 wherein the phosphorus compound is a phosphonate of a poly(hydroxyalkoxyalkyl) sugar wherein each of the alkoxy and alkyl groups has 2 to 4 carbon atoms.

14. A polyurethane according to claim 1 wherein the phosphorus compound is a phosphonate of a poly(hydroxypolyalkoxyalkyl) sugar wherein each of the alkoxy groups and each of the alkyl groups has 2 to 4 carbon atoms.

15. A polyurethane according to claim 1 wherein the phosphorus compound is a phosphonate of a poly(hydroxyalkyl) sucrose wherein the alkyl groups each has 2 to 4 carbon atoms.

16. A polyurethane according to claim 1 wherein the phosphorus compound is a phosphonate of a poly(hydroxyalkoxyalkyl) sucrose wherein the alkoxy and alkyl groups each has 2 to 4 carbon atoms.

17. A polyurethane according to claim 1 wherein the phosphorus compound is a phosphonate of a poly(hydroxypolyalkoxyalkyl) sucrose wherein each of the alkoxy groups and each alkyl group has 2 to 4 carbon atoms.

18. A polyurethane according to claim 1 in the form of a solid foam, said foam having been prepared in the presence of a foaming agent selected from the group consisting of water and a liquefied halogenated alkane wherein at least one halogen is fluorine

19. A polyurethane according to claim 18 wherein the phosphorus compound is replaced by another organic polyhydroxyl reactant in an amount up to 95% by weight of the hydroxyl component in forming the polyurethane.

References Cited by the Examiner
UNITED STATES PATENTS

| | | | |
|---|---|---|---|
| 2,974,159 | 3/1961 | Koral | 260—2.5 |
| 3,053,878 | 9/1962 | Friedman | 260—2.5 |
| 3,089,892 | 5/1963 | Harwood | 260—2.5 |
| 3,092,651 | 6/1963 | Friedman | 260—2.5 |
| 3,094,549 | 6/1963 | Gurgiolo et al. | 260—2.5 |
| 3,142,650 | 7/1964 | Friedman | 260—2.5 |
| 3,142,651 | 7/1964 | Friedman | 260—2.5 |
| 3,159,605 | 12/1964 | Friedman | 260—2.5 |
| 3,214,396 | 10/1965 | Schoepfle et al. | 260—2.5 |

LEON J. BERCOVITZ, *Primary Examiner.*

M. C. JACOBS, *Assistant Examiner.*